United States Patent [19]
Reimann

[11] Patent Number: 4,614,527
[45] Date of Patent: Sep. 30, 1986

[54] DEGASIFIER

[75] Inventor: Jörg Reimann, Karlsruhe, Fed. Rep. of Germany

[73] Assignee: Kernforschungszentrum Karlsruhe G.m.b.H., Karlsruhe, Fed. Rep. of Germany

[21] Appl. No.: 722,403

[22] Filed: Apr. 12, 1985

[30] Foreign Application Priority Data

May 23, 1984 [DE] Fed. Rep. of Germany ....... 3419159

[51] Int. Cl.⁴ ............................................. B01D 19/00
[52] U.S. Cl. ........................................ 55/170; 55/185; 55/192; 55/199
[58] Field of Search .................... 55/55, 159, 168, 170, 55/183, 185, 189, 192, 199

[56] References Cited

U.S. PATENT DOCUMENTS

| | | | |
|---|---|---|---|
| 1,499,710 | 7/1924 | Weisgerber | 55/168 |
| 1,684,834 | 9/1928 | Larsen | 55/199 X |
| 1,775,362 | 9/1930 | Demarcus | 55/199 X |
| 2,191,490 | 2/1940 | Mitterer | 55/159 X |
| 2,243,176 | 5/1941 | Henst | 55/192 |
| 2,768,704 | 10/1956 | Cronkhite | 55/168 X |
| 3,359,708 | 12/1967 | Barber | 55/170 |
| 3,488,926 | 1/1970 | Gilman | 55/199 |
| 4,251,240 | 2/1981 | Brennan et al. | 55/168 |
| 4,276,059 | 6/1981 | Macierewicz | 55/192 X |
| 4,381,928 | 5/1983 | Roffelsen | 55/170 |

FOREIGN PATENT DOCUMENTS

| | | | |
|---|---|---|---|
| 195838 | 2/1958 | Austria | 55/170 |
| 2117662 | 10/1983 | United Kingdom | 55/159 |

Primary Examiner—Robert Spitzer

[57] ABSTRACT

A degasifier for separating gases or vapors from gas/liquid or vapor/liquid flows in pipelines having a horizontal pipe section in which the flow is diverted by providing a back flow panel of a particular design in a particular position in a suction pipe which panel causes separation of bubbles which are removed by the suction pipe, captured in a container situated above the branch pipe and then exhausted therefrom. The degasifier consists of simple parts, has a small volume and can be applied to reduce gas content of a liquid flowing in a pipe for reduced flow resistance.

2 Claims, 5 Drawing Figures 4,614,527

DEGASIFIER

BACKGROUND OF THE INVENTION

The invention relates to a degasifier for separating gas or vapor from gas/liquid or vapor/liquid flows in pipes. Gas/liquid and vapor/liquid flows occur quite frequently in technical applications. In some cases, it is of great advantage to substantially reduce the gas or vapor content. One example thereof is the piping of crude oil. In this case, the piped oil usually has an undesired content of natural gas, which substantially increases the pipeline pressure losses and thereby the power needed to pump the oil. In addition, the pipelines may experience mechanical loads (flow surges) capable of causing failure.

Degasifiers may further be utilized in connection with boilers. During the boiling of liquids, the heat transfer is much better with liquids of low vapor content (that is, with relatively few bubbles) than with liquids of high vapor content wherein the vapor may form an annular envelope along the pipes. By installing a degasifier to lower the vapor content, the necessary heating surface and pumping power can be reduced and consequently the efficiency of the apparatus can be increased.

Conventional gas/liquid separators, such as cyclones and containers with a large surface area, etc., require large volumes and as a result, they are very expensive and are rarely used for the given purposes.

The object of the invention is to separate gases from gas/liquid flows using a degasifier having as little volume as possible and creating as small a pressure drop as possible.

SUMMARY OF THE INVENTION

The invention relates to a degasifier for separating gases or vapors from gas/liquid or vapor/liquid flows in pipelines by means of a pipe section with a branch pipe arranged with respect to the flow direction at an angle of 90° or less.

A container with a substantially greater cross-sectional area than the pipes is disposed above and attached to the branch pipe by means of a conical intermediate section and is provided with a gas discharge pipe at its upper end. A suction pipe having its inlet in the branch pipe above the connection thereof to the pipe section leads to the interior of the container. Mounted perpendicularly on the inner surface of the branch pipe is a back flow panel, which has its outer edges connected to the inside of the branch pipe and is curved downwardly toward the pipe section. The upper end of the back flow panel is disposed in approximately the same plane as the inlet of the suction pipe between said suction pipe and the inner surface of the branch pipe and prevents the communication between the opposite flow areas at this point. Preferably, the interior of the container has provided therein a deflection plate disposed below the liquid level and around the suction pipe. A liquid droplet separator is arranged between the liquid level and the gas discharge pipe and a float is provided which floats on the liquid level and has a valve member attached thereto adapted to seal the gas discharge pipe depending on the height of the liquid in the container.

Such a degasifier not only requires little volume but also has very little pressure losses. As a result, the heat exchanger surface area could, for example, be decreased. The pressure loss of the degasifier in a horizontal pipe is small enough to be neglected in practice since the Bernoulli pressure rise and the pressure loss due to gas bubble turbulence approximately compensate each other. The pressure loss due to friction in the pipe section following the degasifier is, however, substantially reduced when compared with the pressure losses upstream of the degasifier.

SHORT DESCRIPTION OF THE DRAWINGS

Some details of the invention are described below in connection with FIGS. 1 to 5.

Figure 4:
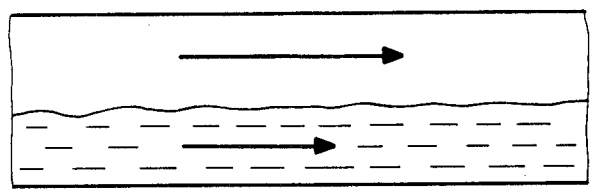
Figure 5:
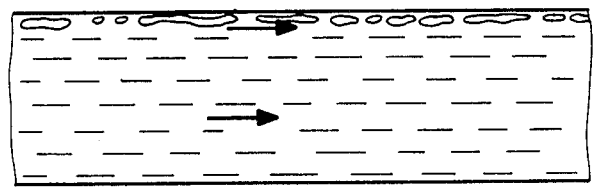

FIG. 4 demonstrates a gas/liquid ripple current in the pipe leading to the degasifier; and FIG. 5 shows a flow with individual bubbles in the line leaving the degasifier in the same scale as that of FIG. 4.

DESCRIPTION OF A PREFERRED EMBODIMENT

Figure 1:
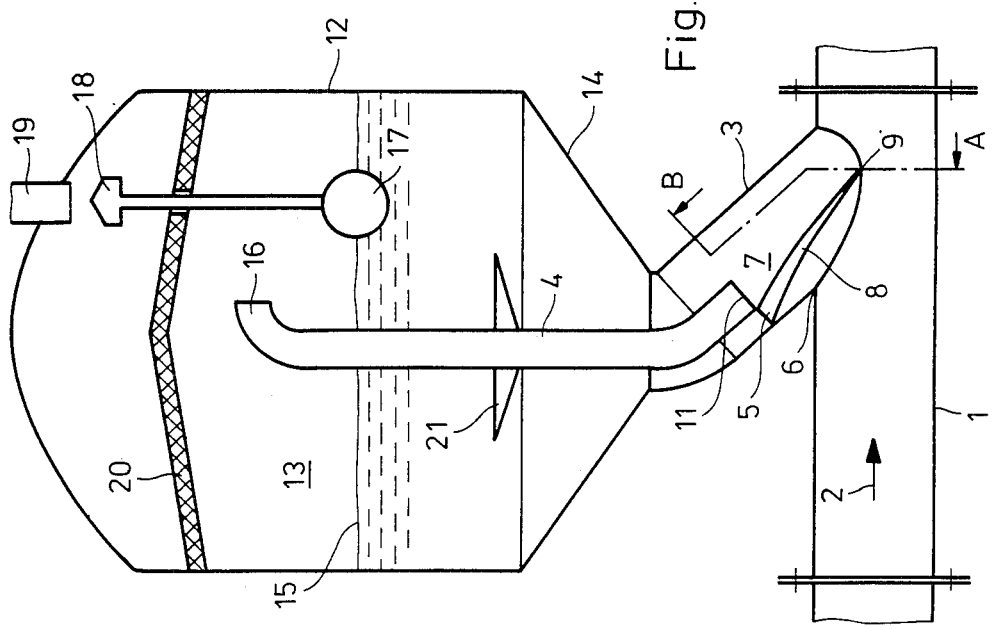
FIG. 1 is a cross-sectional view of the degasifier structure in accordance with the invention.
Figure 2:
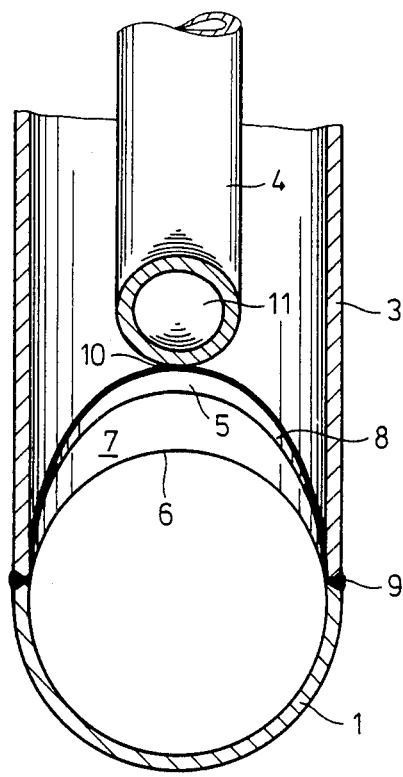
FIG. 2 is a sectional view of the degasifier taken along line AB of FIG. 1.

As shown in FIG. 1, the degasifier is mounted on, and connected to, a horizontal pipe section 1, which is installed in a pipeline in which a gas/vapor/liquid mixture, for example, one containing water, flows in the direction 2. Mounted on the pipe section 1 is a branch pipe 3 of approximately the same diameter disposed at an angle with respect to the flow direction 2, the angle being 90° or less. An edge 6 is formed on the lower side of the branch pipe 3 at the intersection of the pipe walls. A specially shaped back flow panel 5 is mounted to the inner side 7 of the branch pipe 3. The back flow panel 5, shown in FIG. 2 viewed diagonally from the downstream side, is welded to the branch pipe 3 with its outer edge U-shaped in cross-section and oriented perpendicularly to the inner surface 7 of the branch pipe 3. The outer ends 8 of the panel 5 are curved downward along the inner surface of the branch pipe to approximately the contact area 9 of the branch pipe 3 and the pipe section 1. In the pipe section 1 the ends 8 are tapered together to a point and the panel thereby forms a baffle for the flow along the inner surface 7.

The upper end 10 of the back flow panel 5 as seen from the side is situated approximately in the plane 24 of the inlet 11 of a suction pipe 4 which leads from the branch pipe 3 to a container 12, that is, to the inside 13 thereof. The suction pipe 4 can, however, also be situated outside the container 12 and extend through the wall thereof. Inside the container 12, which has a substantially larger diameter than the pipes 1 and 3 and which is connected with the branch pipe 3 through a conical intermediate section 14, a liquid level 15 of the flowing medium is formed. The suction pipe 4 extends with its discharge opening 16, which may be bent toward the side, above the liquid level 15.

A float 17, having a valve member 18 attached thereto, floats on the liquid level 15. At a certain height of the liquid level 15, the valve member 18 closes the gas discharge pipe 19 which leads through the wall of the container 12 to the outside. A liquid droplet separator 20, which prevents the carryover of liquid droplets into the gas discharge pipe 19, is situated in the container 12 between the liquid level 15 and the gas discharge pipe 19. Finally, a deflection plate 21 is provided under the surface of the liquid level 15.

Figure 3:
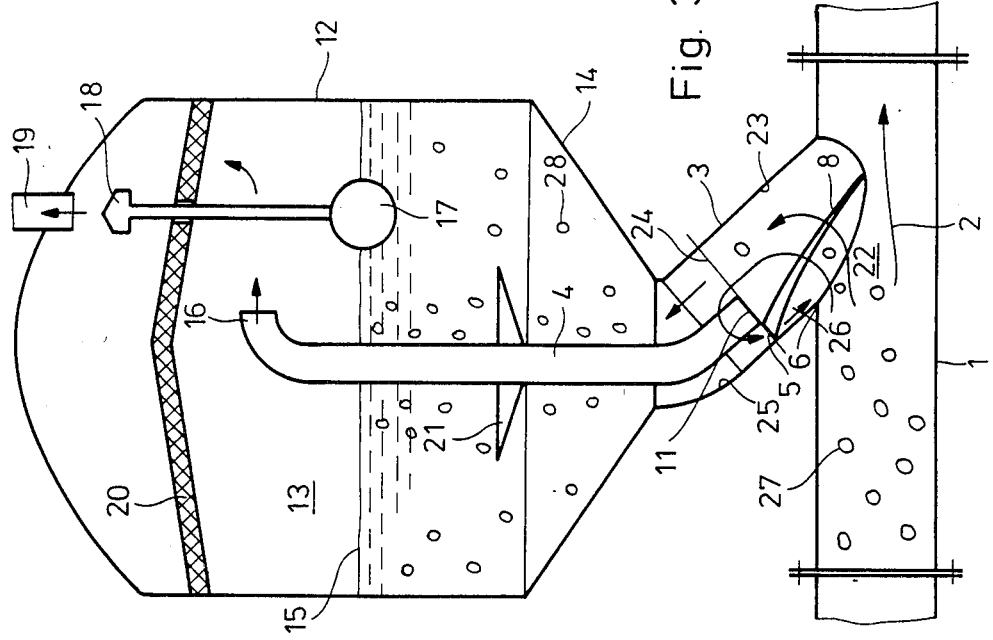
FIG. 3 shows the operation of the degasifier according to FIG. 1.

FIG. 3 shows the operation of the degasifier: When liquid and gas are flowing through the pipe section 1, a part of the liquid/gas mixture will be diverted into the branch pipe 3. Due to (a) the different densities of the two phases and (b) a certain stratification of the supply flow present in most technical applications, the gas content $X_3$, expressed, for example, in percent, entering the branch pipe 3 is greater than the gas content $X_1$ of the supply flow. Upon entering the branch pipe 3, the mixture is in a relatively quiet separation region 22. The liquid, for example, water, has the tendency to collect next to the side 23 of the branch pipe 3 situated opposite the separation region 22. In this manner, the gas is largely separated from the liquid and flows through the suction pipe 4 since the inlet 11 of the suction pipe 4 is so positioned as to remove the gas from this region. The discharge opening 16 of the suction pipe 4 is so arranged as to prevent water carried along with the gas from impinging onto the liquid droplet separator 20, for example, by directing the flow from the discharge opening 16 perpendicularly to the axis of the container and preferably with a tangential directional component.

The flow is decelerated downstream of the plane 24 of the inlet 11. A part of the water reaching the opposite side 25 of the wall flows downward in a stagnant water region 26. This back flow of water is greatly aided by the formation of a flow channel behind the specially shaped back flow panel 5. The return water, however, is prevented from reaching the edge 6, where the gas bubbles are separated from the liquid and led upwardly. To this end, the upper end 10 of the back flow panel 5 is disposed adjacent the inlet 11 and the wall 25 of the branch pipe 3 so that there is no gap therebetween. The flows would otherwise disturb one another at the most unfavorable location. The return water, with the aid of the back flow panel 5, is thereby led to the sides, to regions where it does not interfere with the water flowing upwardly.

Any upwardly flowing water is strongly decelerated in the region of the conical intermediate section 14; the remaining bubbles 28, much less the amount of original bubbles 27, are separated by buoyancy. Any small droplets remaining in the gas in the interior 13 of the container 12 are removed from the gas when passing through the separator and are conducted to the container wall along which they flow downwardly toward the liquid 15.

The purpose of the deflection plate 21 provided in the container 12 above the opening of the branch pipe 3 is to prevent flow surges from directly reaching the liquid droplet separator 20 during intermittent flows in the pipe section 1. In order to adjust the maximum gas flow rate through the degasifier, the liquid level 15 is maintained at a constant height under the liquid droplet separator 20 by means of a regulator, for example, by means of the valve member 18 controlled by the float 17.

In summary, there are two separative effects:
1. One separative effect results from the different densities, that is, the stratification of the supply flow. As a result of this, more gas than liquid reaches the branch pipe 3 at its opening.
2. The second separative effect is based on the suction pipe 4 tending to remove gas above the stagnant water 26, that is, above the flow deflection point where the gas separates, since the stagnant water region 26 lies directly below the inlet 11 of the suction pipe 4. The return water flow, however, does not interfere with the stagnant water 26.

FIGS. 4 and 5 show liquid or flow conditions in the lines leading to and from the degasifier. The angle of the branch pipe 3 herein was 45°; its diameter was equal to that of the pipe section 1. The length of the branch pipe 3 was twice its diameter, the height of the back flow plate 5, that is, the distance between the inlet 11 and the opposite side 25 was about 1/5 of the pipe diameter and the distance between the inlet and the center 2 of the flow was about equal to the pipe diameter. The container 12 had a diameter and a height of four and six times the pipe diameter, respectively.

FIG. 5 shows the flow situation downstream of such an apparatus. There are individual bubbles in the flow, the gas content is greatly reduced as compared with the ripple flow of FIG. 4 and the velocity of the gas is much smaller. The pressure loss due to friction in this pipe section is thereby smaller than that in the pipe section of FIG. 4 by a factor of two or more.

| LISTING OF REFERENCE CHARACTERS | |
| --- | --- |
| 1 | Pipe section |
| 2 | Flow middle and flow direction |
| 3 | Branch pipe |
| 4 | Suction pipe |
| 5 | Back flow panel |
| 6 | Edge |
| 7 | Inner surface |
| 8 | Plate arms or tips |
| 9 | Area of contact |
| 10 | Upper end |
| 11 | Inlet |
| 12 | Container |
| 13 | Interior |
| 14 | Intermediate section |
| 15 | Liquid level |
| 16 | Discharge opening |
| 17 | Float |
| 18 | Valve member |
| 19 | Gas discharge pipe |
| 20 | Liquid droplet separator |
| 21 | Deflection plate |
| 22 | Separation region |
| 23 | Side |
| 24 | Plane |
| 25 | Opposite side |
| 26 | Dead water |
| 27 | Bubbles |
| 28 | Bubbles |

I claim:

1. A degasifier for separating gases from gas/liquid flows in pipelines by means of a pipe section mounted into said pipelines, said pipe section comprising: a branch pipe attached to said pipe section and disposed, with regard to the flow direction at an angle of not more than 90°; container with substantially larger cross-sectional area than the pipes disposed above the branch pipe and being attached to the branch pipe by means of a conical intermediate section; a gas discharge pipe disposed at the container's upper end; a suction pipe arranged with its inlet disposed in the branch pipe above the jointure thereof with the pipe section and extending into the interior of the container above any liquid level therein; a back flow panel arranged in the branch pipe and being attached perpendicularly to the inner surface of the branch pipe, the outer ends of said back flow panel in the branch pipe being bent downward along its inner surface toward said pipe section; the upper end of the back flow panel being situated in approximately the same plane as the inlet of the suction pipe between said suction pipe and the inner surface of the branch pipe so as to block direct communication between the two at their closest point.

2. A degasifier according to claim 1, wherein a deflection plate is arranged within the container below the liquid level and around the suction pipe; a float is provided floating on the liquid and having operatively associated therewith a valve member adapted to engage and seal the gas discharge pipe depending on the height of the liquid level and a liquid droplet separator is arranged between the liquid level and the gas discharge pipe.

* * * * *